US005422177A

United States Patent [19]

Fukuda et al.

[11] Patent Number: 5,422,177

[45] Date of Patent: Jun. 6, 1995

[54] POLYSILOXANE DIELECTRIC MEMBER FOR CARRYING ELECTROSTATIC LATENT IMAGE

[75] Inventors: Yuzuru Fukuda; Shigeru Yagi; Masato Ono; Taketoshi Higashi, all of Minami, Japan

[73] Assignee: Fuji Xerox Co., Ltd., Tokyo, Japan

[21] Appl. No.: 8,975

[22] Filed: Jan. 26, 1993

[30] Foreign Application Priority Data

Jan. 27, 1992 [JP] Japan .................................. 4-033982

[51] Int. Cl.$^6$ .............................................. B32B 27/28

[52] U.S. Cl. .................................... 428/336; 428/446; 428/447; 428/450

[58] Field of Search ...................... 428/447, 450, 473.5, 428/446, 336; 528/26, 28

[56] References Cited

U.S. PATENT DOCUMENTS 5,096,796 3/1992 Mammino et al. .................... 430/67

FOREIGN PATENT DOCUMENTS 60-400831 5/1985 Japan .
61-144651 7/1986 Japan .
61-193157 8/1986 Japan .
63-5355 3/1988 Japan .
63-294586 12/1988 Japan .
63-296051 12/1988 Japan .
2-35459 2/1990 Japan .
2-99962 4/1990 Japan .

*Primary Examiner*—Paul J. Thibodeau
*Assistant Examiner*—David J. Abraham
*Attorney, Agent, or Firm*—Oliff & Berridge

[57] ABSTRACT

The improved dielectric member for carrying electrostatic latent image comprises a support and an overlying dielectric layer, with a thickness of from 3 to 70 μm, that is formed of an polysiloxane/amic acid copolymer. The dielectric member has a relative dielectric constant of 2.0 to 6.0, a surface hardness of 300 to 1,500 on the Vickers scale, and exhibits high reliability in operating characteristics. It can be produced by a process in which the dielectric layer is formed on the support by applying an inorganic polymer compound film-forming material onto the support, and heating the coated layer in vacuum to cure.

5 Claims, 1 Drawing Sheet

POLYSILOXANE DIELECTRIC MEMBER FOR CARRYING ELECTROSTATIC LATENT IMAGE

BACKGROUND OF THE INVENTION

The present invention relates to a dielectric member for carrying electrostatic latent image that is produced in ionography, as well as a process for producing the dielectric member.

An image forming method generally referred to as "ionography" is recently practiced as a means of duplication or printing. According to this method, a support drum having a dielectric film is used as a dielectric member for carrying electrostatic latent image and ions are generated by an ion (charged particle) generating means; then, an electrostatic latent image is formed on the surface of the dielectric member under the action of the generated ions and it is made visible by development with a toner; the resulting toner image is transferred to and fixed on a receiving sheet. The dielectric layer of the dielectric member for carrying the latent electrostatic image formed in ionography is a porous anodized aluminum film. Since the porous anodized aluminum film per se has many micropores open in its surface so that the film has poor wear resistance and toner particles come into pores to cause the problem of image deterioration. Under the circumstances, it was proposed that the porous anodized aluminum film be either subjected to an adsorptive treatment with a silane coupling agent, followed by impregnation with an epoxy resin, or directly impregnated with an epoxy resin containing a silane coupling agent (see JP-A-63-294586). (The term "JP-A" herein used means an unexamined published Japanese patent application.) It has been known to close the pores in the porous anodized aluminum film by impregnation with a wax (JP-A-60-50083) or polytetrafluoroethylene (JP-A-61-193157).

It has also been known to use a different dielectric layer than the porous anodized aluminum film and it is made of a mixture of an inorganic powder, a lubricant and a film-forming resin (JP-A-61-144651).

If the porous anodized aluminum film is subjected to an adsorptive treatment with a silane coupling agent, followed by impregnation with an epoxy resin, or if it is directly impregnated with an epoxy resin containing a silane coupling agent, the result is not completely satisfactory in surface hardness; furthermore, the relative dielectric constant of the film is so great (≧ca. 7) that a satisfactorily good electrification property cannot be achieved. What is more, the impregnation step must be followed by not only the resin baking step but also the subsequent step of removing the surface resin layer. Thus, the overall process becomes complex, thereby reducing the product yield and the reproducibility of operating characteristics. Impregnating the film with pore-closing materials such as waxes and polytetrafluoroethylene has also caused various problems such as poor electrification property, low surface hardness and poor adhesion to the porous anodized aluminum film serving as the dielectric layer.

The other conventional approach which is characterized by using the mixture composed of an inorganic powder, lubricant and film-forming resin has presented various problems including embrittlement of the dielectric layer on account of the presence of the inorganic powder, increased complexity of the manufacturing process and the resultant decrease in the product yield.

SUMMARY OF THE INVENTION

An object, therefore, of the present invention is to provide a dielectric member for carrying electrostatic latent image that is satisfactory in electrification property, that has high surface hardness and whose characteristics are highly reliable.

As a result of the intensive studies conducted in order to attain the object, the present inventors have found that it could be attained by providing on a support a dielectric layer that is formed of an inorganic polymer compound.

Stated briefly, the dielectric member of the present invention for carrying electrostatic latent image comprises a support having thereon a dielectric layer that is formed of an inorganic polymer compound. The dielectric member of the present invention is formed by applying an inorganic polymer compound film-forming material onto the support and then heating the resulting coated layer in vacuum.

DETAILED DESCRIPTION OF THE INVENTION

Figure 1:
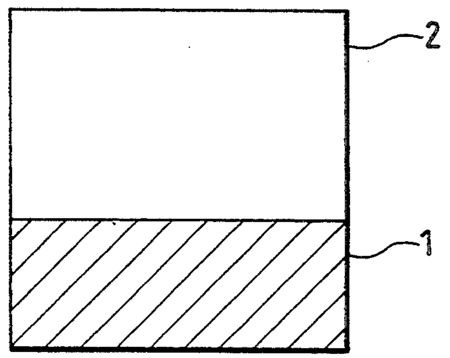
FIG. 1 is a cross-sectional view showing schematically the dielectric member of the present invention for carrying electrostatic latent image.

In FIG. 1, numeral 1 is a support and numeral 2 is a dielectric layer. The support may be either a conductive support typically made of aluminum or alloys thereof (which are hereafter collectively referred to as "aluminum materials"), metals such as stainless steel, nickel and chromium, as well as alloys thereof, or an insulating support typically made of glass, ceramics or insulating resins.

Insulating supports have to be rendered electroconductive on at least one surface thereof. In this case, the dielectric layer may be provided either on the electroconductive surface or on the opposite surface of insulating support. In the latter, the insulating support per se functions as a part of dielectric layer. The insulating support may also have a laminate structure of insulating layer/electroconductive layer/insulating layer, and one of the two insulating layers that is brought into contact with the dielectric layer of the present invention functions as a part of dielectric layer.

The aluminum materials include not only pure aluminum but also aluminum alloys such as those based on Al-Mg, Al-Mg-Si, Al-Mg-Mo, Al-Mn, Al-Cu-Mg, Al-Cu-Ni, Al-Cu, Al-Si, Al-Cu-Zn, Al-Cu-Si and Al-Mg-Si. A suitable aluminum material may be selected from among those materials.

The dielectric layer is formed of an inorganic polymer compound. The inorganic polymer compound is such that the backbone binding chain is composed of inorganic elements and may be exemplified with polymer compounds which are formed from silicone resins or organometallic compounds.

A dielectric layer is provided on the support and it must have not only sufficient electrification property and charge retention to work as dielectric but also high resistance to wear, pressure and ozone; at the same time, it is required to insure satisfactorily high transfer efficiency. To satisfy these requirements, the dielectric layer to be used in the present invention is composed of an inorganic polymer compound whose backbone binding chain is formed of inorganic elements. In a special case, the dielectric layer is formed of an inorganic polymer compound that is composed of siloxane bonds and this is particularly preferred since the dielectric layer is excellent in terms of electrification property, charge retention, and resistance to wear, pressure and ozone. In this preferred case, the inorganic polymer compound is characterized by the presence of absorption due to a siloxane bond at about 1100 $cm^{-1}$ in infrared absorption spectrum.

In accordance with the present invention, the dielectric layer composed of an inorganic polymer compound can be formed by first applying an inorganic polymer compound film-forming material onto a support and then heating the resulting film. The inorganic polymer compound film-forming material to be used may be selected from various examples including silicone resins, metal alkoxides and organometallic complexes.

The method of forming the dielectric layer is described below in greater detail. First, in the case of using a liquid silicone resin as the inorganic polymer compound film-forming material, it may be applied by the usual coating method and then heated to dry. Second, in the case of forming the dielectric layer by the sol-gel method, the inorganic polymer compound film-forming material to be used may be selected from among metal alkoxide compounds such as $Si(OCH_3)_4$, $Si(OC_2H_5)_4$, $Si(OC_3H_7)_4$, $Si(OC_4H_9)_4$, $Al(OCH_3)_3$, $Al(OC_2H_5)_3$, $Al(OC_4H_9)_3$, $Ti(OC_3H_7)_4$, $Zr(OC_3H_7)_4$, $Y(OC_3H_7)_3$, $Y(OC_4H_9)_3$, $Fe(OC_2H_5)_3$, $Fe(OC_3H_7)_3$, $Fe(OC_4H_9)_3$, $Nb(OCH_3)_5$, $Nb(OC_2H_5)_5$, $Nb(OC_3H_7)_5$, $Ta(OC_3H_7)_5$, $Ta(OC_4H_9)_4$, $V(OC_2H_5)_3$ and $V(OC_4H_9)_3$, and organometallic complexes such as tris(acetylacetonato)iron, bis(acetylacetonato)cobalt, bis(acetylacetonato)nickel and bis(acetylacetonato)copper. When applying the sol-gel method, the compounds listed above may be dissolved in alcohol, subjected to hydrolysis under stirring, and the liquid sol that has formed by the reaction is spray- or dip-coated on the support. The coated layer is dried and cured by heating generally at 50 to 300° C. for 30 minutes to 24 hours.

In the case of forming the dielectric layer composed of an inorganic polymer compound comprising siloxane bonds, a bi-, tri- or tetrafunctional alkoxysilane having a methoxy, ethoxy or some other functional group may be used as the inorganic polymer compound film-forming material. These alkoxysilane compounds may have a methyl, ethyl, propyl, isopropyl, phenyl or some other groups as substituents. A suitable alkoxysilane compound is selected as appropriate in view of various factors including the hardness of the cured film, its adhesion to the support, its flexibility and weathering property.

When using the alkoxysilane compounds listed above, they may be diluted with suitable organic solvents (e.g., methyl cellosolve, dimethylformamide, n-methyl-2-pyrrolidone, etc.) for viscosity adjustment and the resulting solution is spray- or dip-coated on the support, followed by heating at generally 100 to 300° C. for 30 minutes to 24 hours to cure the coated layer.

If desired, the alkoxysilane may be used in combination with an amic acid-containing alkoxysilane. In this case, an amic acid having siloxane bonds is formed and, by subsequent film formation, a dielectric layer is produced that is composed of an inorganic polymer compound comprising both siloxane and imide bonds.

Heating of the coated layer to form the dielectric layer of the present invention may be carried out in ambient atmosphere or in vacuum generally not higher than $5.0\times10^4$ Pa, preferably $1.01\times10^4$ Pa or less. Heat curing in vacuum is particularly preferred since the cured dielectric layer will become denser, thereby producing a dielectric layer that is far superior in electrification property, charge retention, and resistance to wear, pressure and ozone.

The inorganic polymer compound constituting the dielectric layer of the present invention preferably has a partial structure represented by formula (I).

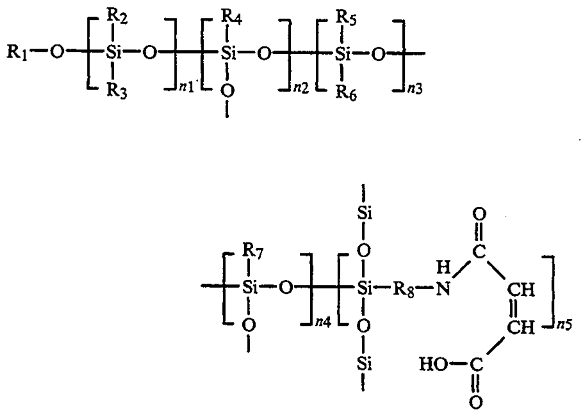

wherein $R_1$, $R_2$, $R_3$, and $R_4$ each represents an alkyl group having 1 to 5 carbon atoms; $R_5$, $R_6$ and $R_7$ each represents an aryl group having 6 to 18 carbon atoms; $R_8$ represents an alkylene group having 1 to 5 carbon atoms; $n_1$, $n_3$ and $n_4$ each represents an integer of 1 to 100; and $n_2$ and $n_4$ each represents 0 or an integer of 1 to 100.

The thickness of the dielectric layer to be formed in the present invention may be set at a desired value but it is usually in the range of 3 to 70 μm, preferably 5 to 30 μm. If the thickness of the dielectric layer is less than 3 μm, the surface potential of the charged dielectric layer becomes unduly low; and if it is more than 70 μm, the manufacturing cost increases to an unacceptable level.

The dielectric member of the present invention generally has the relative dielectric constant of 2.0 to 6.0, preferably 3.0 to 5.0 and the Vickers hardness at its surface of 300 to 1,500, preferably 400 to 1,00.

The following examples are provided for the purpose of further illustrating the present invention but are in no way to be taken as limiting.

EXAMPLE 1

A support in the form of a cylindrical aluminum pipe (diameter: about 100 mm) made of 99.9% pure Al-Mg alloy was cleaned with Freon and further cleaned by application of ultrasonic wave in distilled water.

The support was then sprayed with a coating solution containing 50% by weight of a silicon hard coating agent ("X-41-9710H", produced by Shin-Etsu Chemical Co., Ltd.) represented by the following formula and 50% by weight of methyl cellosolve:

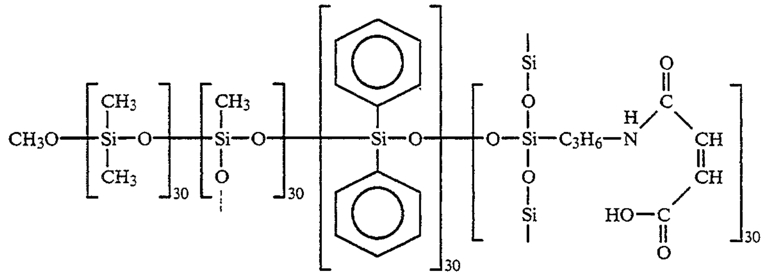

Figure 2:
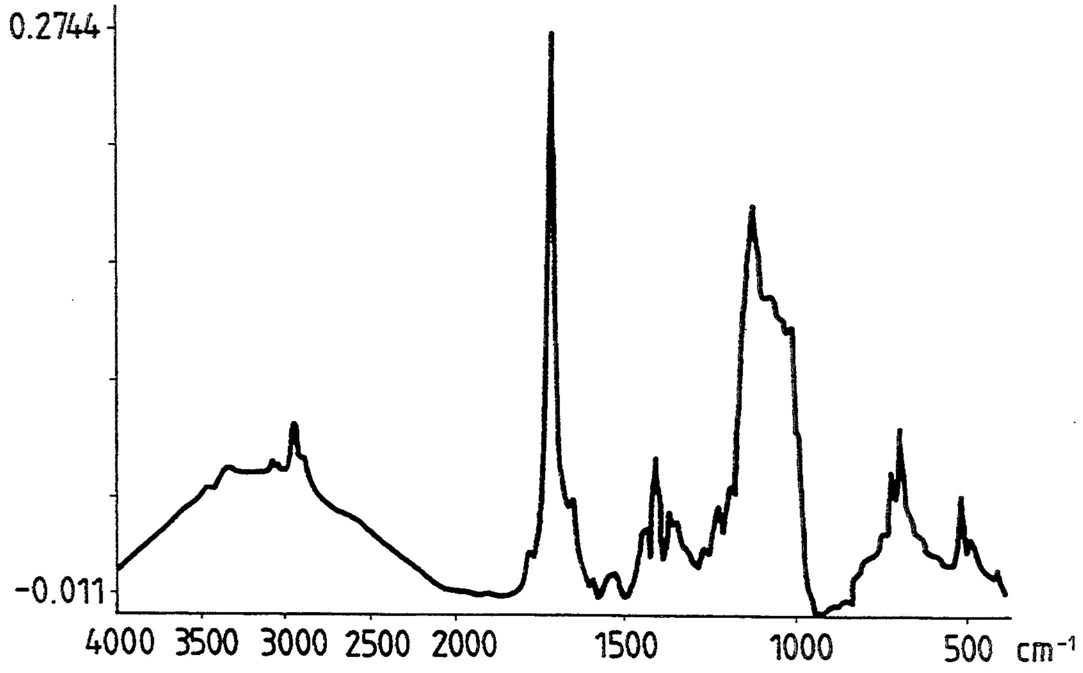
FIG. 2 is an infrared absorption spectrum chart for the surface layer of the dielectric member.

The coated layer was reactively cured by heating in ambient atmosphere at 190° C. for 4 hours to form a 18 μm-thick dielectric layer. Similarly, a dielectric film was formed on a silicon wafer by the same procedures of coating and curing as described above for measurement of infrared (IR) absorption spectrum. The IR absorption spectrum of the film is shown in FIG. 2. Two sharp peaks, one being due to an imide bond at 1700 $cm^{-1}$ and the other due to a siloxane bond at 1100 $cm^{-1}$, were observed in the IR absorption spectrum.

The thus produced dielectric member for carrying electrostatic latent image had a relative dielectric constant of 3.4 and, when given surface charges to a charge density of 142.8 $nC/cm^2$, the surface potential of the charged member was 829 volts. The attenuation of the surface potential that occurred with the lapse of time after charging was very small. Measurement of the surface hardness of the dielectric member showed that it was very hard with a Vickers hardness of 700. When the dielectric layer was examined with a transmission electron microscope, fine voids were observed in the layer.

The dielectric member was set on an ionographic image forming apparatus that adopted a pressure transfer method and the image produced was evaluated. Its was found that an immaculate sharp image was obtained.

EXAMPLE 2

A support in the form of a cylindrical aluminum pipe (diameter: about 100 mm) made of 99.9% pure Al-Mg alloy was cleaned with Freon and further cleaned by application of ultrasonic wave in distilled water.

The support was then sprayed with a coating solution containing 50% by weight of a silicon hard coating agent (X-41-9710H) set forth above and 50% by weight of methyl cellosolve.

The coated layer was reactively cured by heating in a vacuum of $1\times10^{-3}$ Torr at 190° C. for 4 hours to form a 17 μm-thick dielectric layer. Similarly, a dielectric film was formed on a silicon wafer by the same procedure of coating and curing. As in Example 1, two sharp peaks were observed in an IR absorption spectrum of the film, one being due to an imide bond at 1700 $cm^{-1}$ and the other due to a siloxane bond at 1100 $cm^{-1}$.

The thus produced dielectric member for carrying electrostatic latent image had a relative dielectric constant of 3.2 and, when given surface charges to a charge density of 142.8 $nC/cm^2$, the surface potential of the charged member was 857 volts. The attenuation of the surface potential that occurred with the lapse of time after charging was very small. Measurement of the surface hardness of the dielectric member showed that it was very hard with a Vickers hardness of 800. When examined with a transmission electron microscope, no voids were observed in the dielectric layer.

The dielectric member was set on an ionographic image forming apparatus that adopted a pressure transfer method and the image produced was evaluated. It was found that an immaculate sharp image was obtained.

EXAMPLE 3

A support in the form of a cylindrical aluminum pipe (diameter: about 100 mm) made of 99.9% pure Al-Mg alloy was cleaned with Freon and further cleaned by application of ultrasonic wave in distilled water.

Subsequently, a coating solution containing 50% by weight of tetraethoxysilane and 50% by weight of ethyl alcohol was applied repeatedly to the support by dip coating. The coated layer was reactively cured by heating in ambient atmosphere at 190° C. for 4 hours to form a 10 μm-thick dielectric layer.

The thus produced dielectric member for carrying electrostatic latent image had a relative dielectric constant of 3.6 and, when given surface charges to a charge density of 142.8 $nC/cm^2$, the surface potential of the charged member was 448 volts. The attenuation of the surface potential that occurred with the lapse of time after charging was very small. Measurement of the surface hardness of the dielectric member showed that it was very hard with a Vickers hardness of 650.

The dielectric member was set on an ionographic image forming apparatus that adopted a pressure transfer method and the image produced was evaluated. It was found that an immaculate sharp image was obtained.

EXAMPLE 4

A support in the form of a cylindrical aluminum pipe (diameter: about 100 mm) made of 99.9% pure Al-Mg alloy was cleaned with Freon and further cleaned by application of ultrasonic wave in distilled water.

Subsequently, a coating solution containing 50% by weight of tetraethoxysilane and 50% by weight of ethyl alcohol was applied repeatedly to the support by dip coating. The coated layer was reactively cured by heating in a vacuum of $1\times10^{-3}$ Torr at 190° C. for 4 hours to form a 10 μm-thick dielectric layer.

The thus produced dielectric member for carrying electrostatic latent image had a relative dielectric constant of 3.4 and, when given surface charges to a charge density of 142.8 $nC/cm^2$, the surface potential of the charged member was 474 volts. The attenuation of the surface potential that occurred with the lapse of time after charging was very small. Measurement of the surface hardness of the dielectric member showed that it was very hard with a Vickers hardness of 700.

The dielectric member was set on an ionographic image forming apparatus that adopted a pressure transfer method and the image produced was evaluated. It was found that an immaculate sharp image was obtained.

COMPARATIVE EXAMPLE

A support in the form of a cylindrical aluminum pipe (diameter: about 100 mm) made of 99.9% pure Al-Mg alloy was cleaned with Freon and further cleaned by application of ultrasonic wave in distilled water.

Subsequently, with a liquid electrolyte (3 wt% oxalic acid in solution) held at 28° C., a dc voltage of 30 volts was applied between the aluminum pipe and a cylindrical cathodic aluminum plate to effect anodization for 60 minutes. As a result, an anodized aluminum film was formed in a thickness of 20 μm. This porous anodized aluminum film was treated with a silane coupling agent and then impregnated with an epoxy resin in the following manner. First, the aluminum pipe with the anodized aluminum film was dipped for 2 minutes in a 1 wt% aqueous solution of a silane coupling agent (γ-glycidoxylpropyl trimethoxysilane) held at 20° C. Thereafter, the pipe was heated at 100° C. for 15 min. Subsequently, an epoxy resin paint (KANCOAT 51-L1058, produced by Kansai Paint Co., Ltd.) was brush-coated onto the pipe and cured by heating at 210° C. for 30 minutes. The surface resin layer was scraped off with a knife blade and the exposed surface of the pipe was polished with abrasive paper to produce a dielectric member for carrying electrostatic latent image.

The member had a relative dielectric constant of 7.0 and, when given surface charges to a charge density of 142.8 $nC/cm^2$, the surface potential of the charged member was 461 volts. Furthermore, the surface potential decayed noticeably in the course of time subsequent to charging. Measurement of the surface hardness of the dielectric member showed that it had a Vickers hardness of 410.

When the dielectric member was set on an ionographic image forming apparatus that adopted a pressure transfer method and the image produced was evaluated, it was found that some duplicates had images with defects caused by the pressure transfer drum or the metallic cleaning blade.

Having the structural features described herein, the dielectric member of the present invention for carrying electrostatic latent image is satisfactory not only in terms of electrification property and charge retention but also in surface hardness, hence exhibiting high resistance to wear and pressure as well as high ozone resistance.

While the invention has been described in detail and with reference to specific embodiments thereof, it will be apparent to one skilled in the art that various changes and modifications can be made therein without departing from the spirit and scope thereof.

What is claimed is:

1. A dielectric member for carrying an electrostatic latent image consisting essentially of a support layer having thereon a single dielectric layer wherein said dielectric layer has a thickness of from 3 to 70 μm, and is formed of an inorganic polymer compound having a partial structure represented by formula (I):

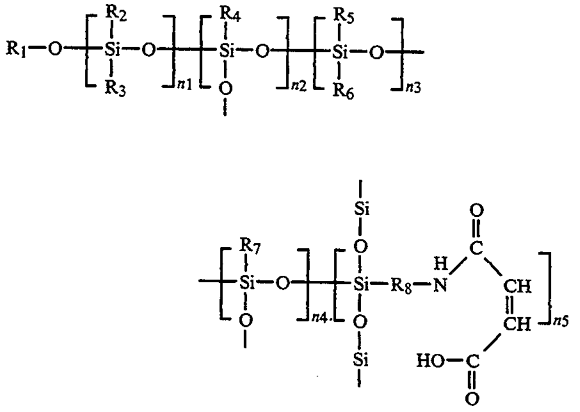

wherein $R_1$, $R_2$, $R_3$, and $R_4$ each represents an alkyl group having 1 to 5 carbon atoms; $R_5$, $R_6$ and $R_7$ each represents an aryl group having 6 to 18 carbon atoms; $R_8$ represents an alkylene group having 1 to 5 carbon atoms; $n_1$, $n_3$ and $n_5$ each represents an integer of 1 to 100; and $n_2$ and $n_4$ each represents 0 or an integer of 1 to 100.

2. A dielectric member as in claim 1, which has a relative dielectric constant of 2.0 to 6.0.

3. A dielectric member as in claim 2, which has a relative dielectric constant of 3.0 to 5.0.

4. A dielectric member as in claim 1, which has a surface hardness of 300 to 1,500 on the Vickers scale.

5. A dielectric member as in claim 4, which has a surface hardness of 400 to 1,000 on the Vickers scale.

* * * * *